(12) United States Patent
Yi et al.

(10) Patent No.: US 8,254,119 B2
(45) Date of Patent: Aug. 28, 2012

(54) HOST COMPUTER ATTACHED TO MONITOR

(75) Inventors: Shu-Ni Yi, Shenzhen (CN); Lei Liu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 318 days.

(21) Appl. No.: 12/696,014

(22) Filed: Jan. 28, 2010

(65) Prior Publication Data

US 2011/0110025 A1  May 12, 2011

(30) Foreign Application Priority Data

Nov. 9, 2009 (CN) .......................... 2009 1 0309455

(51) Int. Cl.
G06F 1/16 (2006.01)

(52) U.S. Cl. ........... 361/679.6; 361/679.22; 361/679.59; 361/724; 312/223.1; 312/223.2; 248/917

(58) Field of Classification Search .............. 361/679.6, 361/679.29
See application file for complete search history.

(56) References Cited

U.S. PATENT DOCUMENTS

| | | | |
|---|---|---|---|
| 4,964,018 A * | 10/1990 | Mallory et al. | 361/725 |
| 5,636,101 A * | 6/1997 | Bonsall et al. | 361/679.27 |
| 6,366,452 B1 * | 4/2002 | Wang et al. | 361/679.22 |
| 7,092,248 B2 * | 8/2006 | Shu | 361/679.21 |
| 7,150,440 B2 * | 12/2006 | Yuan | 248/372.1 |
| 7,233,486 B2 * | 6/2007 | Kim | 361/679.29 |
| 7,349,203 B2 * | 3/2008 | Jobs et al. | 361/679.55 |
| 7,477,510 B2 * | 1/2009 | Liu | 361/679.08 |
| 7,599,172 B2 * | 10/2009 | Barreau et al. | 361/657 |
| 7,978,465 B2 * | 7/2011 | Osaka et al. | 361/679.22 |
| 8,047,489 B2 * | 11/2011 | Watanabe | 248/292.14 |
| 2002/0126442 A1 * | 9/2002 | Lim et al. | 361/681 |
| 2003/0002245 A1 * | 1/2003 | Hsien-Chin | 361/683 |
| 2003/0063432 A1 * | 4/2003 | Farrow et al. | 361/680 |
| 2003/0128511 A1 * | 7/2003 | Nagashima et al. | 361/687 |
| 2004/0057196 A1 * | 3/2004 | Yang | 361/683 |
| 2004/0084588 A1 * | 5/2004 | Liu et al. | 248/291.1 |
| 2006/0133016 A1 * | 6/2006 | North et al. | 361/681 |
| 2011/0011990 A1 * | 1/2011 | Tsai et al. | 248/122.1 |

* cited by examiner

Primary Examiner — Jinhee Lee
Assistant Examiner — Anthony Q Edwards
(74) Attorney, Agent, or Firm — Altis Law Group, Inc.

(57) ABSTRACT

A computer includes a monitor and a host computer coupled to a monitor. The monitor includes a back cover and a plurality of sides extending forwards form the back cover. The host computer includes a computer enclosure and a plurality electronic element. The computer enclosure includes a bottom board and a plurality of sideboard extending forward from the bottom board to abut against the plurality of sides of the monitor. A receiving space is formed between the back cover of the monitor and the bottom board of the computer enclosure. The number of electronic elements are received in the receiving space and mounted on the bottom board of the computer enclosure.

12 Claims, 6 Drawing Sheets

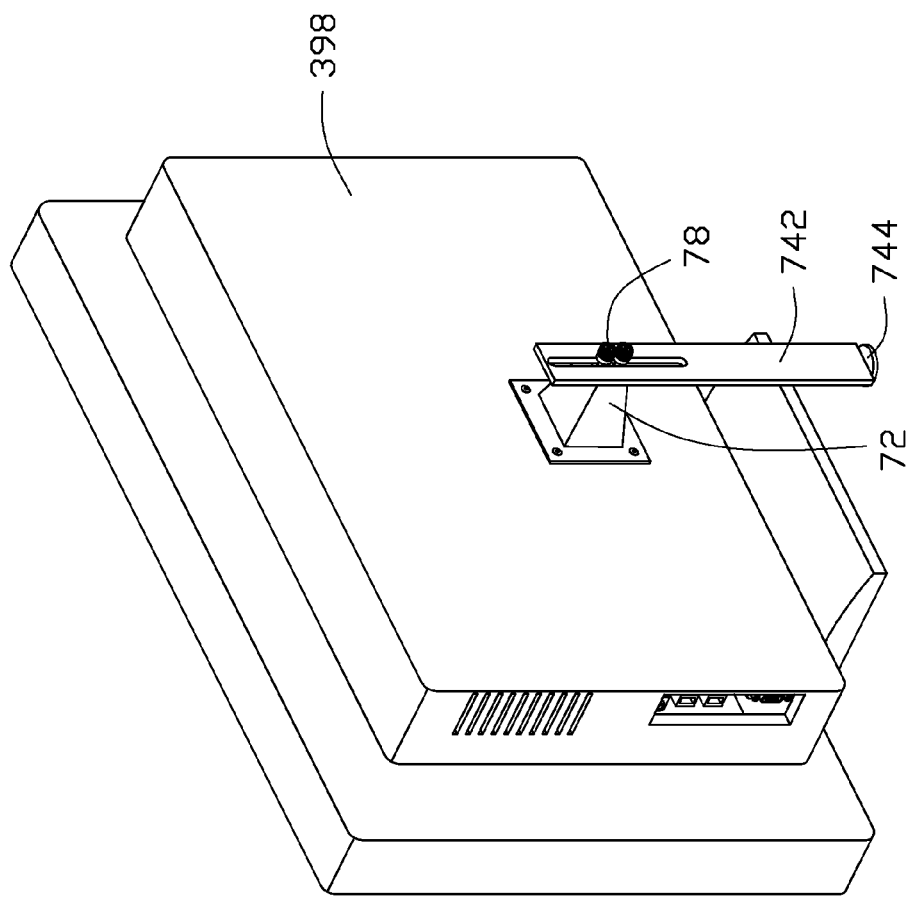

HOST COMPUTER ATTACHED TO MONITOR

BACKGROUND

1. Technical Field

The present disclosure relates to computers and, particularly, to a host computer attached to a monitor.

2. Description of Related Art

Although computer enclosures for desktop computers are nowadays made smaller and smaller, they still consume too much space once placed on a table to be connected to a monitor.

BRIEF DESCRIPTION OF THE DRAWINGS

FIG. 6 is similar to FIG. 4, but viewed from the back.

DETAILED DESCRIPTION

Figure 1:
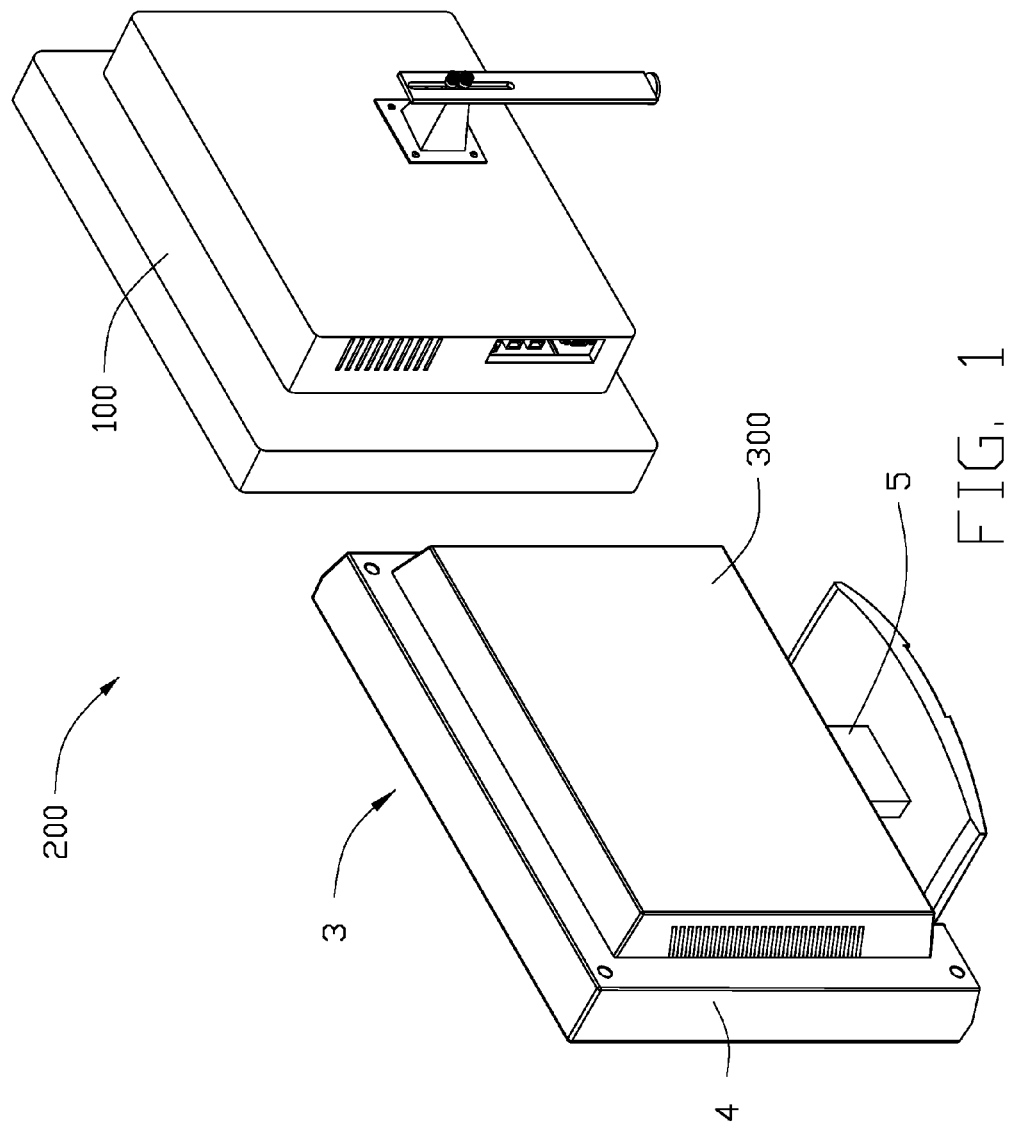
FIG. 1 is an exploded, isometric rear view of an exemplary embodiment of a computer, the computer including a host computer and a monitor.

Referring to FIG. 1, an exemplary embodiment of a computer 200 includes a monitor 3 and a host computer 100 attached to the monitor 3. The monitor 3 includes a back cover 300, a plurality of sides 4 extending forward form periphery of the back cover 300, and a holder 5 attach to one side 4 at bottom to support the monitor 3.

Figure 2:
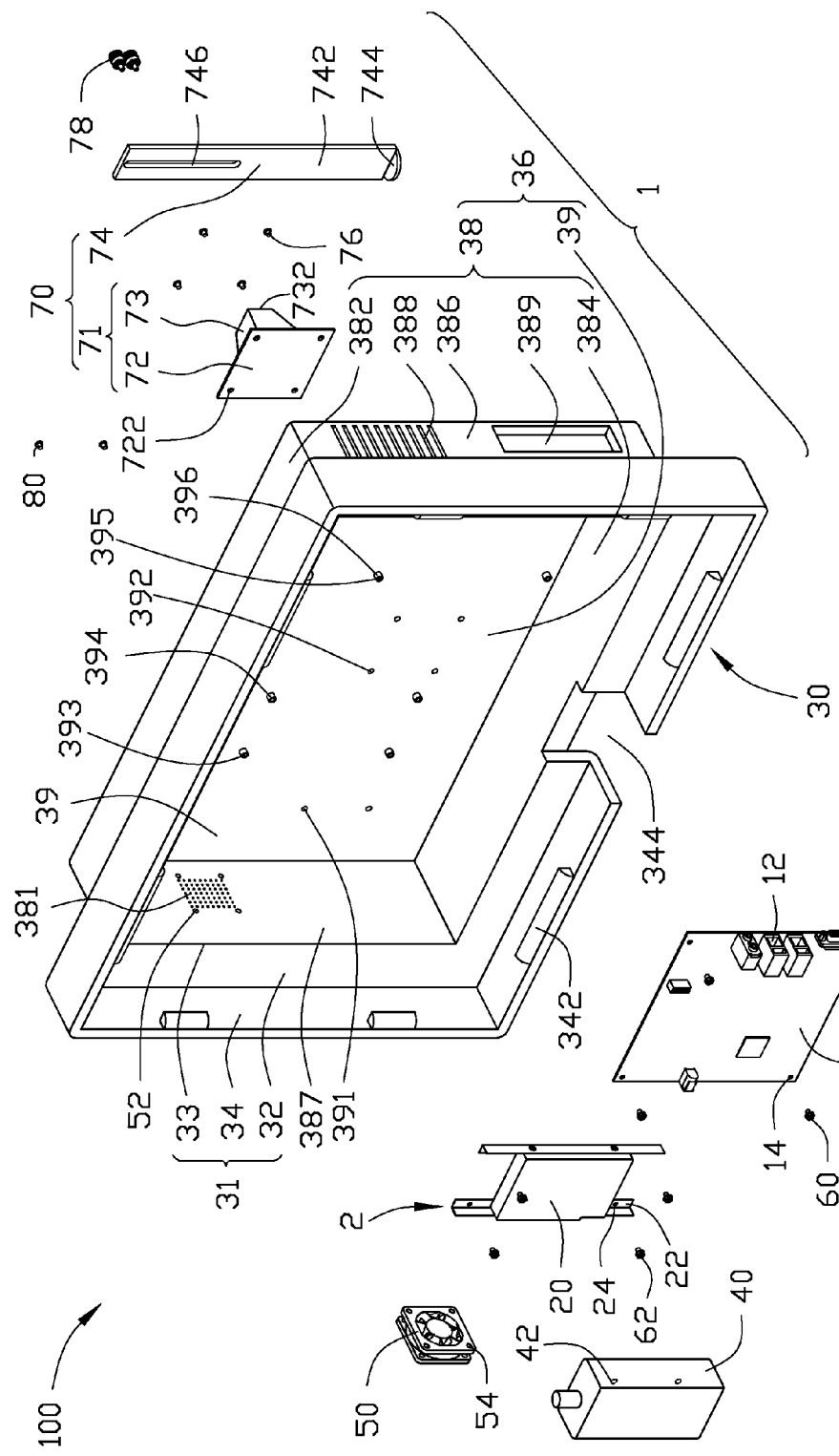
FIG. 2 is an exploded, isometric view of the host computer of FIG. 1.

Referring to FIG. 2, the host computer 100 includes a computer enclosure 1, and a plurality of electronic elements, such as a motherboard 10, a hard disk drive (HDD) assembly 2, a power supply 40, and a fan 50, received in the computer enclosure 1.

The HDD assembly 2 includes an HDD 20, two brackets 22 fixed to opposite sides of the HDD 20. Two holes 24 are defined in opposite ends of each bracket 22, respectively. A plurality of input/output (I/O) interfaces 12 is mounted on the motherboard 10. Four holes 14 are defined in four corners of the motherboard 10, respectively. Four holes 54 are defined in four corners of the fan 50, respectively. Two screw holes 42 are defined in the power supply 40.

The computer enclosure 1 includes a latching portion 31, a receiving portion 36, and a supporting element 70.

The latching portion 31 includes a rectangular-frame shaped baseboard 32 and four sideboards 34 vertically extending frontwards from four outer sides of the baseboard 32. An outline formed by the four sideboards 34 matches an outline of the monitor 3. Two spaced latching blocks 342 extend from an inner surface of each sideboard 34, adjacent to a front edge of the corresponding sideboard 34, to catch with four sides of the monitor 3. An opening 33 is bounded by inner sides of the baseboard 32.

The receiving portion 36 is integrally and vertically connected to the inner sides of the baseboard 32. The receiving portion 36 includes a bottom board 39 parallel to the baseboard 32 and opposite to the opening 33, and a connection wall 38 perpendicularly connected between the bottom wall 39 and the baseboard 32. The connection wall 38 includes a top wall 382, a bottom wall 384 opposite to the top wall 382, a first sidewall 386, and a second sidewall 387 opposite to the first sidewall 386.

Four screw holes 392 are defined in a center of the bottom board 39, to fix the supporting element 70 in place. Four pillars 394 each axially defining a screw hole 393 therein vertically extend from an inner surface of the bottom board 39, located on a first side of the screw holes 392, to fix the HDD assembly 2 in place. Four pillars 396 each axially defining a screw hole 395 therein vertically extend from the inner surface of the bottom board 39, located on a second side of the screw holes 392 opposite to the first side, to fix the motherboard 10 in place. Two through holes 391 are defined in the bottom board 39, adjacent to the four pillars 394, to fix the power supply 40 in place.

A rectangular opening 389, corresponding to the plurality of I/O interfaces 12 of the motherboard 10, and a plurality of air outlets 388 are defined in the first sidewall 386. A rectangular heat-dissipating area 381 defining a plurality of through holes corresponding to the fan 50 is defined in the second sidewall 387. Four screw holes 52 to fix the fan 50 are defined in the second sidewall 387, adjacent to four corners of the heat-dissipating area 381.

A notch 344 is defined in the sideboard 34 and the baseboard 32 corresponding to the bottom wall 384, and located between the corresponding latching blocks 342, to avoid interference with a holder 5 of the monitor 3.

The supporting element 70 includes a connection portion 71 and a supporting portion 74. The connection portion 71 includes a rectangular connection board 72 and a prismoid-shaped connection body 73 extending from a surface of the connection board 72. Four through holes 722 are defined in four corners of the connection board 72, respectively. Two screw holes (not shown) are defined in an end face 732 of the connection body 73, to engage with the supporting portion 74. The supporting portion 74 includes a base 744 and a beam 742 perpendicularly mounted on the base 744. A sliding slot 746 is defined in an upper end of the beam 742, perpendicular to the base 744.

In other embodiments, the latching blocks 342 may only extend from the sideboards 34 corresponding to the top wall 382 and bottom wall 384. The notch 344 is only defined in the sideboard 34 corresponding to the bottom wall 384, to avoid the interference with the holder 5 of the monitor 3.

Figure 3:
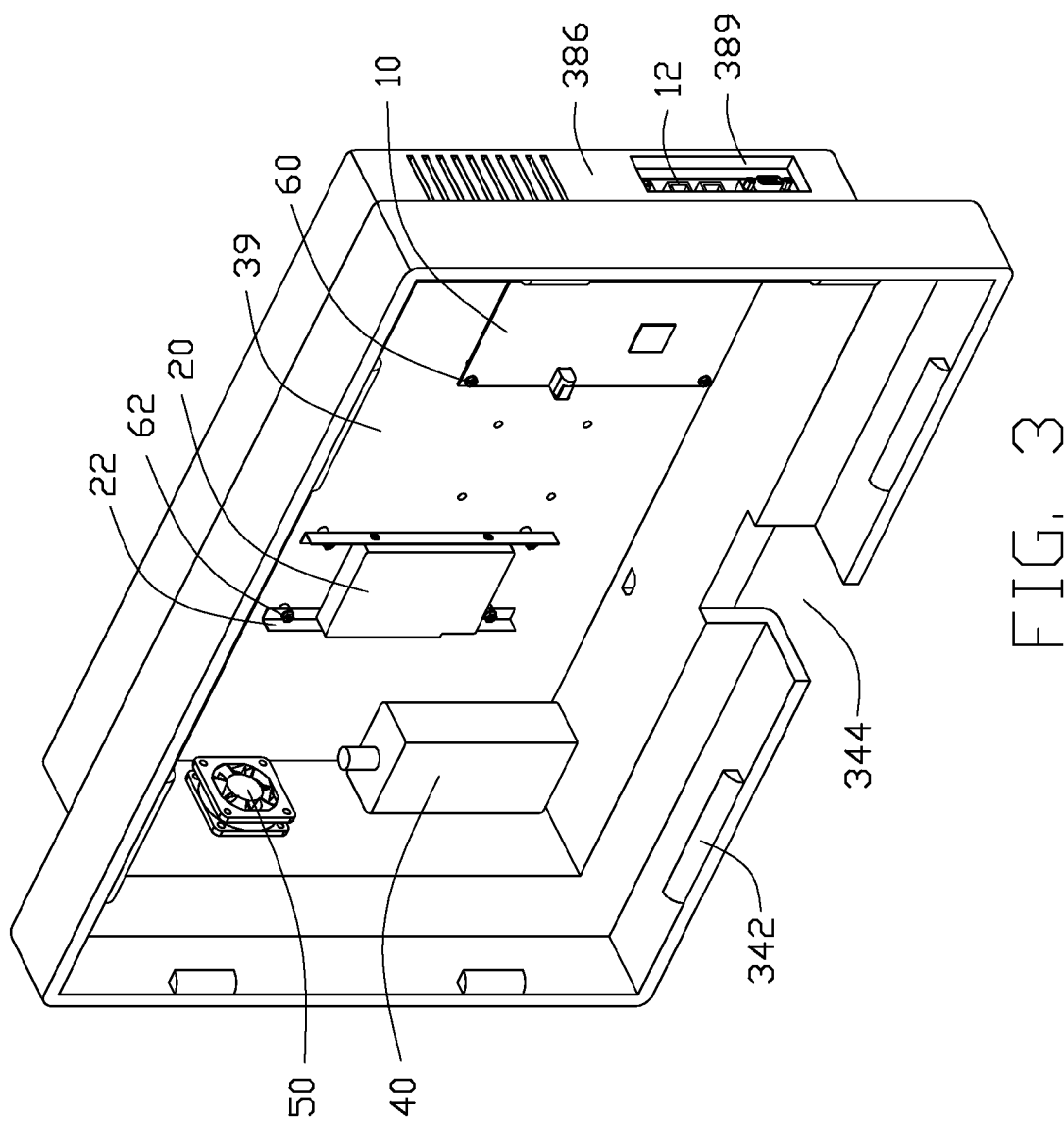
FIG. 3 is an assembled view of the host computer of FIG. 2.
Figure 4:
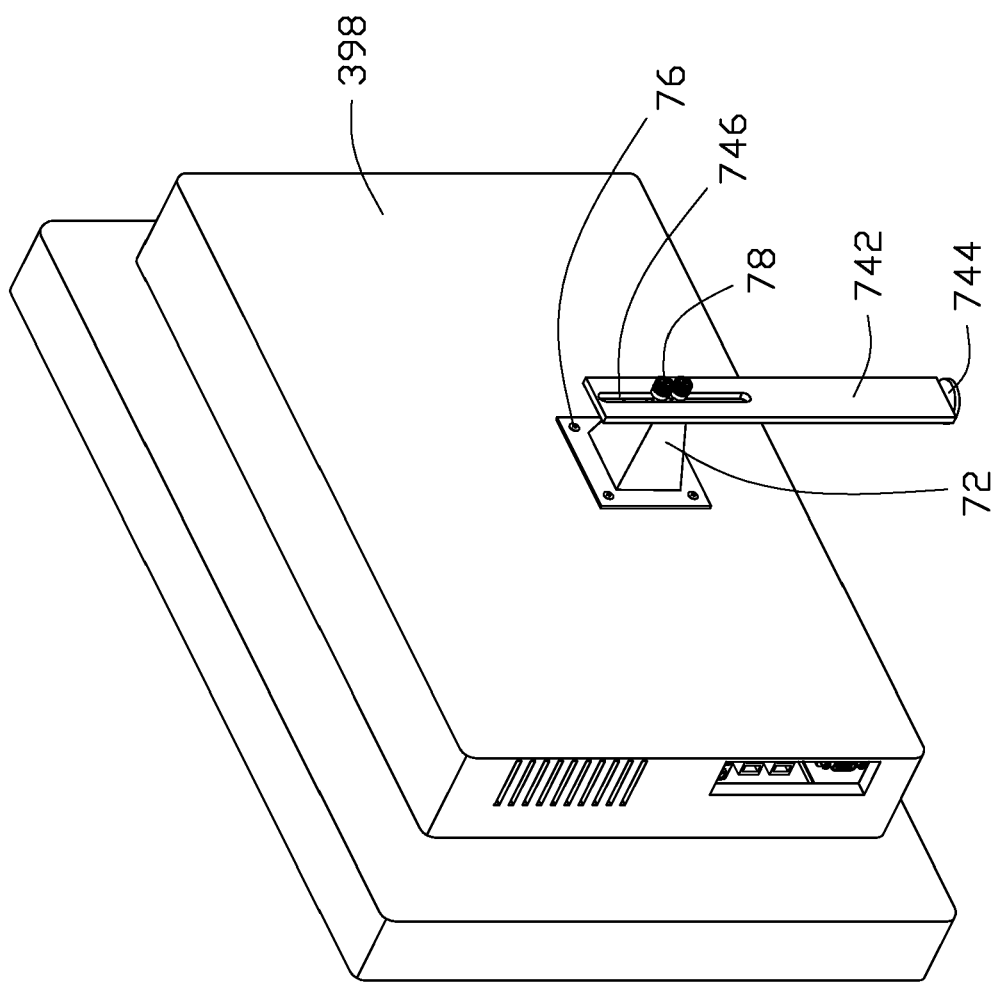
FIG. 4 is similar to FIG. 3, but viewed from the back of the computer.

Referring to FIGS. 3 and 4, in assembling the host computer 100, four screws 60 extend through the four holes 14 defined in the motherboard 10, to be screwed into the screw holes 395 of the corresponding pillars 396, thereby fixing the motherboard 10 to the inner surface of the bottom board 39. The plurality of I/O interfaces 12 of the motherboard 10 is exposed through the opening 389, thereby peripheral devices, such as a keyboard and a mouse, can be conveniently connected to the plurality of I/O interfaces 12. Since different kinds of motherboards have different I/O interfaces, users can select a corresponding I/O blocking plate to cover the opening 389 and allow the plurality of I/O interfaces 12 to be exposed.

Four screws 62 extend through the screw holes defined in the brackets 22 of the HDD 20 and are screwed in the screw holes 393 of the corresponding pillars 394, thereby fixing the HDD 20 to the inner surface of the bottom board 39. Two screws 80 extend through the through holes 391 defined in the bottom board 39 and are screwed in the two screw holes 42 defined in the power supply 40, thereby fixing the power supply 40 to the inner surface of the bottom board 39. Four screws (not shown) extend through the holes 54 of the fan 50 and are engaged in the screw holes 52 of the second sidewall 387, to fix the fan 50 to the second sidewall 387.

Four screws 76 extend through the through holes 722 defined in the connection board 72 and are screwed in the screw holes 392 defined in the bottom board 39, thereby, fixing the connection portion 71 to an outer surface 398 of the bottom board 39. Two screws 78 extend through the sliding slot 746 defined in the supporting portion 74 and are screwed in the screw holes of the connection body 73, thereby, fixing the supporting portion 74 to the connection portion 72.

In other embodiments, the HDD 20 and the power supply 40 can be fixed to the receiving portion 36 via other fixing devices, such as rivets. The supporting element 70 can be omitted. The supporting portion 74 can also be directly fixed onto the outer surface 398 of the bottom board 39. The supporting portion 74 can be other structures.

Figure 5:
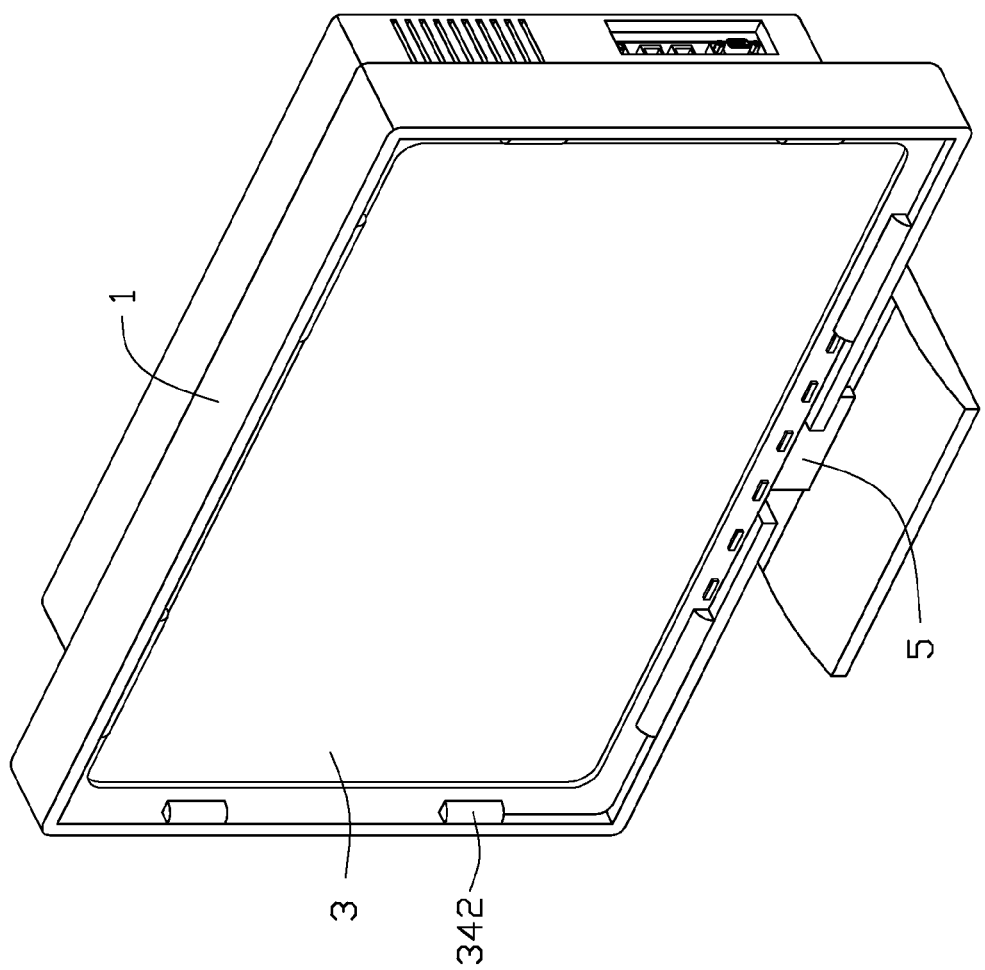
FIG. 5 is an assembled view of the computer of FIG. 1.

Reference to FIGS. 5 and 6, in assembling the computer 200, the computer enclosure 1 covers the back cover 300 and the plurality of sides 400 of the monitor 3. The latching blocks 342 catch with the plurality of sides of the monitor 3. A receiving space (not shown) is formed between the back cover 300 and the bottom board 39 of the computer enclosure 1. The base 744 of the supporting portion 74 is placed on a table (not shown), to support the computer enclosure 1 with the monitor 3. The sliding slot 746 is adjustable for passage of screws 78, and for keeping the monitor 3 stable and erect.

The monitor 3, the peripheral devices, and the motherboard 10 are connected via cables. The power supply 40 supplies power to the motherboard 400, the HDD 20, the fan 50, and the peripheral devices connected to the plurality of I/O interfaces 12.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A computer comprising:
   a monitor comprising a back cover and a plurality of sides extending forwards from periphery of the back cover; and
   a host computer comprising:
      a computer enclosure attach to the monitor, the computer enclosure comprising:
         a bottom board; and
         a plurality of sideboards extending forward from the bottom board to abut against the plurality of sides of the monitor to form a receiving space between the back cover of the monitor and the bottom board of the computer enclosure; and
      a plurality of electronic elements received in the receiving space and mounted to the bottom board of the computer enclosure, wherein the computer enclosure is step-shaped, the plurality of sideboards comprise a first step extending forward from sides of the bottom board, a second step whose outline is greater that an outline of the first step, and a connection portion connecting the first and second step, a plurality of latching blocks extends from inner side of the second step to abut against the plurality of sides of the monitor, an opening and a plurality of air outlet are defined in the first step.

2. The computer of claim 1, wherein the monitor further comprises a holder attached to a bottom of the monitor to support the monitor, a notch is defined in a bottom of the plurality of sideboards of the computer enclosure, to avoid interference with the holder of the monitor.

3. The computer of claim 2, wherein a plurality of pillars each defining a screw hole therein extends from the bottom board, to fix the plurality of electronic elements.

4. The computer of claim 1, further comprising a supporting element, wherein the supporting element is adjustably mounted to the bottom board to support the monitor.

5. The computer of claim 4, wherein the supporting element is mounted to an outer surface, away from the receiving space, of the bottom board via a fixing element, a sliding slot is defined in the supporting element, a position that the supporting element is mounted to the outer surface of the bottom board is adjusted via adjusting a position that the fixing element extending through the sliding slot of the supporting element.

6. The computer of claim 4, wherein the supporting element comprises a connection portion mounted to an outer surface, away from the receiving space, of the bottom board and a supporting portion mounted to the connection portion via a fixing element, a sliding slot is defined in the supporting portion, a position that the supporting portion is mounted to the connection portion is adjusted via adjusting a position that the fixing element extending through the sliding slot of the supporting portion.

7. A host computer to be coupled to a monitor, the host computer comprising:
   a computer enclosure comprising:
      a latching portion to cover and catch with a plurality of sides of the monitor; the latching portion comprising a baseboard, a plurality of sideboards extending from outer sides of the baseboard to cover and catch with the plurality of sides of the monitor, and a first opening is bounded by inner sides of the baseboard, and
      a receiving portion integrally connected to the inner sides of the baseboard and opposite to the first opening, to cover a back cover of the monitor; and
      a plurality of electronic element received in the receiving portion;
   wherein a notch is defined in a bottom sideboard of the plurality of sideboards of the latching portion, to avoid interference with a holder of the monitor, a plurality of latching blocks extends form the other sideboards of the plurality of sideboards to catch with the other sides of the plurality of sides of the monitor.

8. The host computer of claim 7, wherein the receiving portion comprises a bottom board and a connection wall connected between the bottom wall and the inner sides of the baseboard, a second opening and a plurality of air outlets are defined in the connection wall, the plurality of electronic element are mounted on the bottom board.

9. The host computer of claim 8, wherein a plurality of pillars each defining a screw hole therein extends from the bottom board, to fix the plurality of electronic elements.

10. The host computer of claim 7, further comprising a supporting element, wherein the supporting element is adjustably mounted to the receiving portion to support the monitor.

11. The host computer of claim 10, wherein the supporting element is mounted to the receiving portion via a fixing element, a sliding slot is defined in the supporting element, a position that the supporting element is mounted to the receiving portion is adjusted via adjusting a position that the fixing element extending through the sliding slot of the supporting element.

12. The host computer of claim 10, wherein the supporting element comprises a connection portion mounted to the receiving portion and a supporting portion mounted to the connection portion via a fixing element, a sliding slot is defined in the supporting portion, a position that the supporting portion is mounted to the connection portion is adjusted via adjusting a position that the fixing element extending through the sliding slot of the supporting portion.

* * * * *